(12) United States Patent
Barcin

(10) Patent No.: US 11,420,643 B2
(45) Date of Patent: Aug. 23, 2022

(54) DEVICE AND METHOD FOR CALIBRATING VEHICLE ASSISTANCE SYSTEMS

(71) Applicant: Robert Bosch GmbH, Stuttgart (DE)

(72) Inventor: Buelent Barcin, Jesingen (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 16/488,705

(22) PCT Filed: Feb. 13, 2018

(86) PCT No.: PCT/EP2018/053516
§ 371 (c)(1),
(2) Date: Aug. 26, 2019

(87) PCT Pub. No.: WO2018/153723
PCT Pub. Date: Aug. 30, 2018

(65) Prior Publication Data
US 2021/0197841 A1 Jul. 1, 2021

(30) Foreign Application Priority Data

Feb. 27, 2017 (DE) .......................... 102017203155.7

(51) Int. Cl.
*B60W 40/00* (2006.01)
*B60W 50/04* (2006.01)
(Continued)

(52) U.S. Cl.
CPC ............. *B60W 50/045* (2013.01); *G06T 7/70* (2017.01); *B60W 2050/0083* (2013.01); *B60W 2420/42* (2013.01); *G06T 2207/30252* (2013.01)

(58) Field of Classification Search
CPC ....... B60W 50/045; B60W 2050/0083; B60W 2420/42; G06T 7/70; G06T 2207/30252
(Continued)

(56) References Cited

U.S. PATENT DOCUMENTS

2007/0115440 A1* 5/2007 Wiklof ................. H04N 9/3194
353/69
2010/0201809 A1* 8/2010 Oyama .................... G01C 3/14
348/135
(Continued)

FOREIGN PATENT DOCUMENTS

CN 1516806 A 7/2004
CN 1742193 A 3/2006
(Continued)

OTHER PUBLICATIONS

International Search Report for PCT/EP2018/053516, dated May 17, 2018.

*Primary Examiner* — Tyler J Lee
*Assistant Examiner* — Tiffany P Ohman
(74) *Attorney, Agent, or Firm* — Norton Rose Fulbright US LLP; Gerard Messina

(57) ABSTRACT

A calibrating device for calibrating vehicle assistance systems is described. The device includes: at least one target pattern; at least one sensor, which is designed to detect the position and the orientation of a vehicle to be measured with respect to the calibrating device; and a positioning device, which is designed to position the at least one target pattern on the basis of the position of the vehicle to be measured, which is detected by the at least one sensor, in such a way that the at least one target pattern is situated in a specified orientation at a specified position with respect to the vehicle to be measured.

14 Claims, 2 Drawing Sheets

(51) Int. Cl.
*G06T 7/70* (2017.01)
*B60W 50/00* (2006.01)
(58) Field of Classification Search
USPC .......................................................... 701/36
See application file for complete search history.

(56) References Cited

U.S. PATENT DOCUMENTS

2013/0325252 A1* 12/2013 Schommer .......... G01S 7/52004
                                                                                     701/33.1
2014/0184814 A1* 7/2014 Lin ........................... G06T 7/80
                                                                                    348/187
2016/0154406 A1   6/2016 Im et al.

FOREIGN PATENT DOCUMENTS

| CN | 101059340 A | 10/2007 |
|---|---|---|
| CN | 102150008 A | 8/2011 |
| CN | 102930544 A | 2/2013 |
| CN | 106408611 A | 2/2017 |
| DE | 102010062696 A1 | 6/2012 |
| DE | 102014113919 A1 | 5/2015 |
| DE | 102014116917 A1 | 5/2015 |
| EP | 1953520 A2 | 8/2008 |
| EP | 2150772 A1 | 2/2010 |
| KR | 101571485 B1 | 11/2015 |
| WO | 2018067354 A1 | 4/2018 |

* cited by examiner

DEVICE AND METHOD FOR CALIBRATING VEHICLE ASSISTANCE SYSTEMS

FIELD

The present invention relates to a device and to a method for calibrating vehicle assistance systems (VAS), in particular for detecting the position, angle and attitude of vehicles for VAS calibration.

BACKGROUND INFORMATION

Motor vehicles increasingly come equipped with driver assistance systems (DAS), for example a lane-keeping assistant, a lane-change warning, lane departure warning, a thermal imaging (night vision) camera and/or a parking assistant.

In particular in optical, i.e., camera-based driver assistance systems, it is necessary that at least one camera of the driver assistance system provides a precise image of the surroundings that conforms to reality and that is correctly aligned with the vehicle. For this purpose, all cameras of the driver assistance system must be calibrated.

In static calibration, for example of a front camera, measuring panels ("calibrating panels"), which have an optical pattern ("target pattern"), are used, for example in order to align a driver assistance system using calibrating tools ("DAS calibrating tools") with respect to the rear axle of a vehicle. The alignment comprises in particular setting the spacing, the yaw angle, the roll angle and the pitch angle correctly. The measuring panels must be aligned left and right centrically with respect to the vehicle and at a right angle with respect to the longitudinal driving axis of the vehicle so that the DAS may be calibrated at an appropriate distance from the calibrating system.

The measuring panels must be aligned with great precision. Manual alignment of the measuring panels is therefore costly and requires much care and experience. Moreover, a measuring station is required having a leveled floor in order to avoid deviations in elevation.

Furthermore, there are vehicle-specific DAS systems, for example front camera systems, that require a dynamic calibrating drive. For this purpose, the vehicle is switched to a calibrating mode, e.g., with the aid of a diagnostic unit, and is trained by actually driving at constant speed in driving lanes on the road. The dynamic calibrating drive is very costly, time-consuming and difficult to execute in densely populated areas.

Some manufacturers prescribe a combination of static and dynamic calibrations, which is composed of the two calibrating methods.

An object of the present invention is to simplify the calibration of vehicle assistance systems.

SUMMARY

According to one exemplary embodiment of the present invention, a calibrating device for calibrating vehicle assistance systems comprises at least one target pattern; at least one sensor, which is designed to detect the position and the orientation of a vehicle to be measured with respect to the calibrating device; and a positioning device, which is designed to position the at least one target pattern on the basis of the position of the vehicle to be measured, which is detected by the at least one sensor, in such a way that the at least one target pattern is situated in a specified orientation at a specified position with respect to the vehicle to be measured.

According to one exemplary embodiment of the present invention, a method for calibrating vehicle assistance systems comprises:
(a) positioning a calibrating device in front of a vehicle to be measured in accordance with one exemplary embodiment of the present invention;
(b) determining the position and orientation of the vehicle with respect to the calibrating device with the aid of the at least one sensor; and
(c) positioning the at least one target pattern in such a way that it is situated in a specified orientation at a specified position with respect to the vehicle.

The target pattern may be a static (target) pattern, as is required for a static calibration. The target pattern may also be a variable dynamic (target) pattern, however, in particular a tracking sequence (video sequence), which in combination with a roller test stand allows for a dynamic calibration of the VAS. Exemplary embodiments of the present invention therefore also comprise a combination of a roller test stand and a calibrating device according to an exemplary embodiment of the present invention.

The present invention makes it possible to position the at least one target pattern automatically in the correct position as a function of the current position of the vehicle to be measured. In this manner, it is possible to perform the positioning quickly, conveniently and with high precision.

In particular, no additional auxiliary devices such as lasers, for example, are required to align the target patterns correctly. This reduces the space required for the measuring station. The positioning device is also able to take into account and compensate for elevation variations. Hence, a leveled measuring station is not required.

In one exemplary embodiment, the calibrating device also comprises a moving device, which is designed to move the at least one target pattern and/or the entire calibrating device mechanically. In this manner, the at least one target pattern may be positioned automatically in a specified orientation at a desired position.

In one exemplary embodiment, the moving device comprises at least one wheel or a roller, which simplifies moving the at least one target pattern and/or the entire calibrating device mechanically.

The wheel or the roller may be guided in particular in at least one rail. The combination of a wheel or a roller and a rail makes it possible to guide the at least one target pattern and/or the entire calibrating device at low friction and with high precision to the desired position.

In one exemplary embodiment, the moving device is designed to turn the at least one target pattern about at least one axis in order to situate the at least one target pattern in accordance with the orientation of the vehicle on the measuring station exactly into the desired position and orientation on the measuring station.

In one exemplary embodiment, the calibrating device comprises at least one electronic display device, which is designed to represent the at least one target pattern optically.

The positioning device may be designed in particular to vary the display of the at least one target pattern on the at least one electronic display device in order to position the target pattern in a specified orientation at a specified position. In one exemplary embodiment, the positioning device is designed in particular to vary also the size, the orientation and/or the position of the target pattern on the at least one electronic display device as a function of the position and the alignment of the vehicle on the measuring station.

It is thus possible to display the at least one target pattern in the required size, alignment and orientation without requiring for this purpose that the at least one target pattern or the display device be moved mechanically. A calibrating device that comprises at least one such electronic display device may therefore be operated in a particularly simple, cost-effective and low-maintenance manner. Since no space is required for moving the at least one target pattern, it is possible to implement such a display device in a particularly space-saving manner.

In one exemplary embodiment, the at least one sensor comprises at least one camera that is designed to detect the vehicle to be measured optically. With the aid of a sensor, the position of the vehicle with respect to the calibrating device may be determined in particularly simple and convenient fashion. The camera may be developed in particular as a stereo camera so as to be able to determine the position and alignment of the vehicle in all three spatial directions with high precision. Multiple cameras and/or sensors may also be provided.

The at least one sensor may be situated at different positions, in particular also at the ceiling above the vehicle.

In order to improve the accuracy of the calibration and in particular to minimize inaccuracies resulting from a deviation of the longitudinal driving axis of the vehicle from the longitudinal body axis, it is possible to mount wheel adapters on the wheels of the rear axle of the vehicle, which are detected by at least one camera so as to be able to determine the alignment of the rear axle and thus of the longitudinal driving axis of the vehicle with high accuracy.

Alternatively or additionally, it is possible to determine the distance of the vehicle from the calibrating device by ultrasonic sensors and/or by mechanical sensors. The measuring results of multiple sensors may be combined with one another in order to improve the accuracy of the position determination.

In one exemplary embodiment, a method for calibrating a device for vehicle measurement comprises attaching a marking on the vehicle, which may be developed for example in the form of at least one adhesive dot so as to simplify the automatic determination of the alignment and position of the vehicle by the at least one sensor and/or to increase the accuracy.

In this instance, the method may comprise in particular attaching the marking at a location on the longitudinal driving axis of the vehicle, for example below the rear view mirror on the windshield of the vehicle.

Exemplary embodiments of the present invention are explained in greater detail below with reference to the figures.

DETAILED DESCRIPTION OF EXAMPLE EMBODIMENTS

Figure 1:
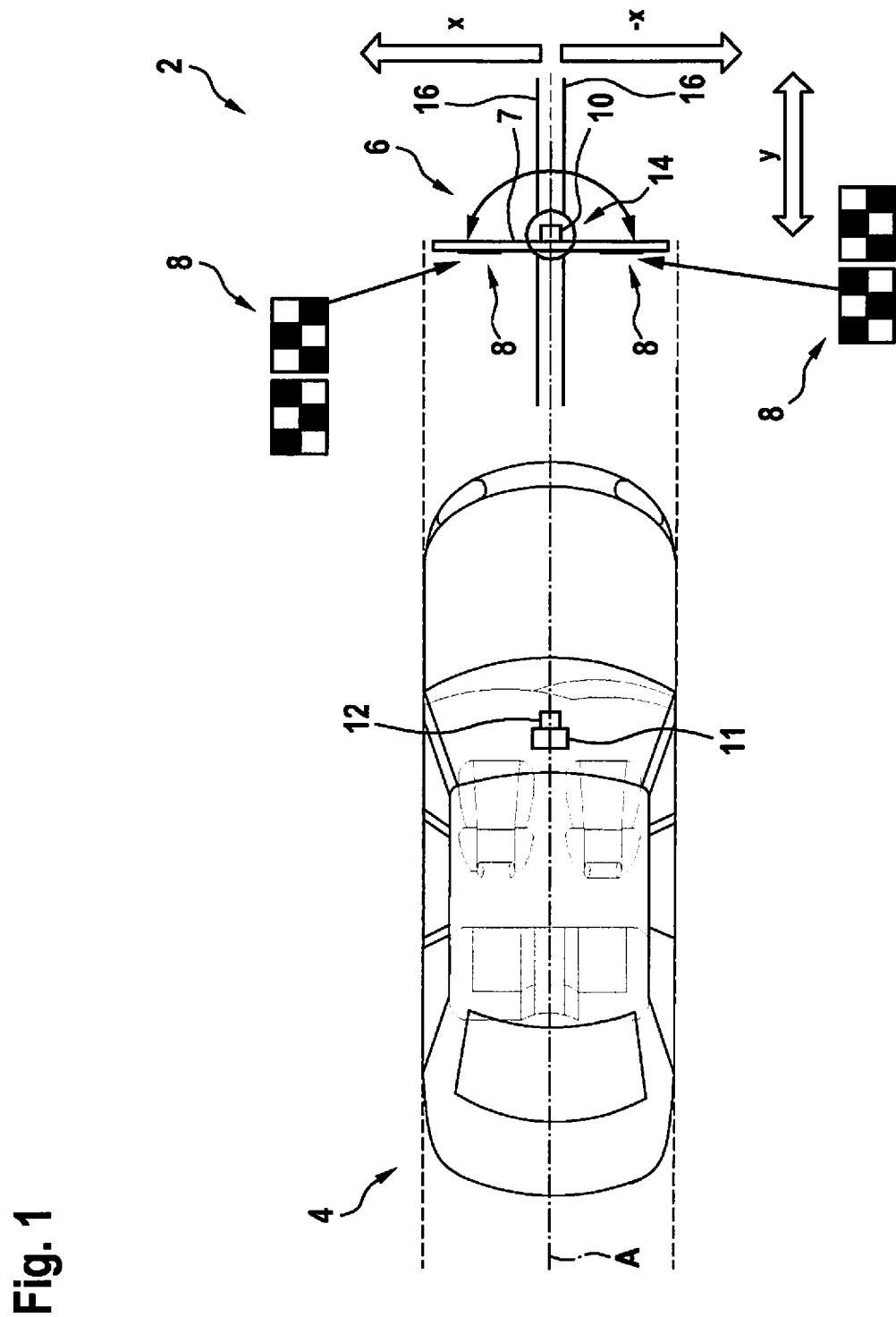
FIG. 1 shows a schematic top view onto a measuring station for measuring vehicles including a calibrating device according to a first exemplary embodiment of the present invention.

FIG. 1 shows in a schematic illustration a top view onto a measuring station 2 for measuring vehicles including a vehicle 4 to be measured and a calibrating device 6 according to a first exemplary embodiment of the present invention.

Calibrating device 6 has two elements (calibrating panels) facing vehicle 4, which are attached to a beam 7 that extends essentially horizontally and orthogonally with respect to the longitudinal driving axis A of vehicle 4.

The calibrating panels may be mechanical calibrating panels, onto which the static target patterns 8 are printed. In order to allow for dynamic calibration, the calibrating panels may also be designed to have variable image display devices, which make it possible to represent both static target patters 8 as well as dynamic target patters 8, in particular tracking sequences. The variable image display devices may comprise in particular displays and/or projectors in combination with suitable projection surfaces.

Beam 6 is mounted so as to be rotatable about an axis B, which is oriented orthogonally with respect to the plane of measuring station 2. By swiveling about axis B, it is possible to orient beam 6 so that it is at a right angle with respect to longitudinal driving axis A of vehicle 4. Calibrating device 6 has a positioning device 14, which is designed to swivel beam 6, and at least one sensor 10, which detects the position and the alignment of vehicle 4 with respect to calibrating device 6.

The data provided by the at least one sensor 10 make it possible for positioning device 14 to align target patterns 8 in the desired position and alignment, i.e. with the desired distance and angle, with respect to vehicle 4. Sensor 10 may be developed in particular as camera 10.

Alternatively or additionally to the system shown in the figures, it is also possible to situate the at least one sensor 10 in other positions, e.g. on the ceiling above vehicle 4.

A measuring target 12 may be attached at a defined location on vehicle 4, e.g. on longitudinal driving axis A below rear view mirror 11, so as to facilitate sensor 10 detecting the position and alignment of vehicle 4. Measuring target 12 may be developed e.g. as adhesive dot 12, which may be removed again after completion of the measuring process.

Positioning device 14 is furthermore designed to move beam 7 and with it target patterns 8 in all three spatial directions in order to be able to situate target patterns 8 at the desired positions with respect to vehicle 4.

Beam 7 and target patterns 8 may be shifted in particular at a right angle with respect to longitudinal axis A of vehicle 4 (x axis), parallel to longitudinal driving axis A of vehicle 4 (y axis) and perpendicularly to the floor of measuring station 2 (perpendicularly to the drawing plane of FIG. 1).

For this purpose, calibrating device 6 may be mounted in particular on wheels and/or rollers 15, which make it possible to shift calibrating device 6 and thus target patterns 8 in space. The wheels and/or rollers 15 may be guided in rails 16, which are developed in or on the floor of measuring station 2.

Figure 2:
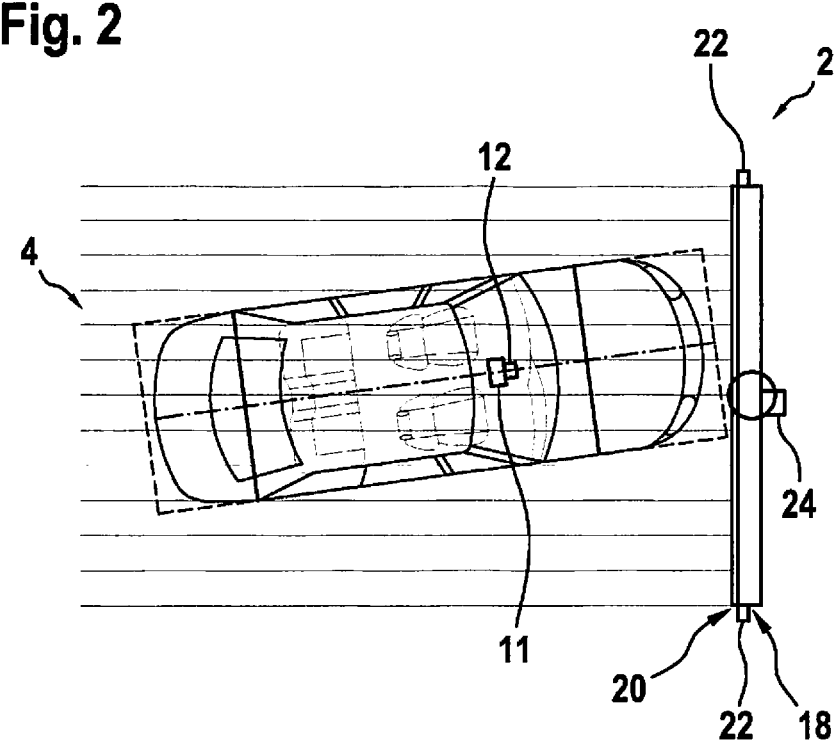
FIG. 2 shows a schematic top view onto a measuring station for measuring vehicles including a calibrating device according to a second exemplary embodiment of the present invention.
Figure 3:
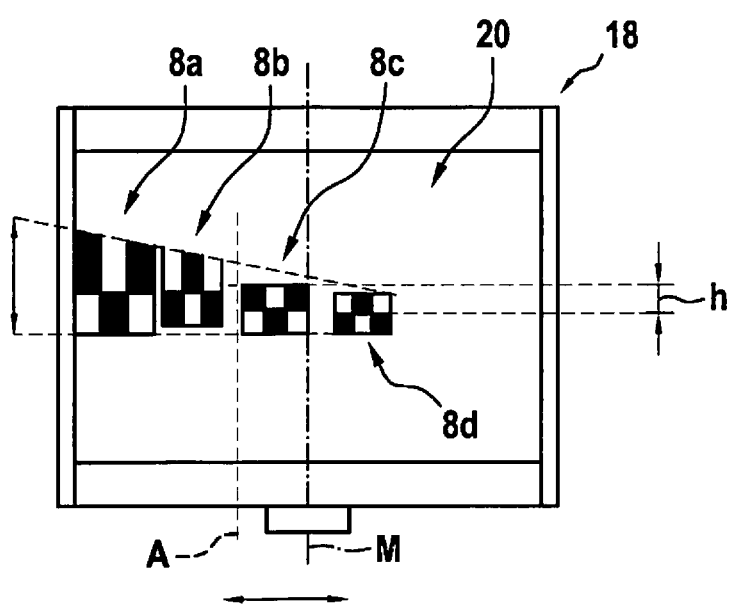
FIG. 3 shows schematically the representations of target patterns on the display device of a calibrating device according to the second exemplary embodiment of the present invention.

FIGS. 2 and 3 schematically show a second exemplary embodiment of a calibrating device 18 according to the present invention.

A calibrating device 18 according to the second exemplary embodiment is situated in stationary fashion and has on a side facing vehicle 4 a large-area display device 20, which may be designed as a display and/or as a projection surface in combination with at least one projector (not shown). Display device 20 is designed so as to be able to display images of static or dynamic target patterns 8a-8d of different, in particular any, position, size and orientation.

Calibrating device 18 according to the second exemplary embodiment is equipped with one or multiple sensors 22, which make it possible to determine the spatial position and alignment of vehicle 4 with respect to calibrating device 18.

On the basis of the data supplied by the at least one sensor 22, positioning device 16 calculates the appropriate position, size and alignment of target patterns 8a-8d on display device 20. Positioning device 16 controls display device 20 in such a way that the latter displays target patterns 8a-8d in the desired alignment and size at the desired positions.

In a schematic illustration, FIG. 3 shows four exemplary representations of target patters 8a-8d.

Of the images of target patterns 8a-8d shown in FIG. 3, respectively one is displayed on each side of longitudinal driving axis A of vehicle 4 depending on the position and alignment of vehicle 4 in front of calibrating device 18.

A calibrating device 18 according to the second exemplary embodiment makes it possible to take into account a shift of longitudinal driving axis A of vehicle 4 with respect to center axis M of display device 20 and to display target patterns 8a-8d accordingly asymmetrically with respect to the center axis M of display device 20.

Different elevations of vehicle 4 with respect to calibrating device 18, which result for example on a measuring station that is not leveled, may be taken into account and compensated for by positioning device 16 by an elevation shift h of the images of target patterns 8a-8d on display device 20.

If vehicle 4, as shown in FIG. 2, is situated in such a way that its longitudinal axis A is not orthogonal with respect to the plane of display device 20 or calibrating device 18, target patters 8a-8b are represented in distorted fashion in order to take into account the non-orthogonal alignment of vehicle 4 with respect to display device 20 and to represent target patterns 8a-8b so as if they were aligned orthogonally with respect to longitudinal axis A of vehicle 4.

In order to allow for a dynamic calibration, it is possible to display dynamic target patterns, in particular tracking sequences, in place of static target patterns 8a-8d.

A calibrating device 6, 18 according to the present invention significantly simplifies the alignment of target patterns 8, 8a-8d, which are used in vehicle measurement. The automatic alignment of target patterns 8, 8a-8d makes it possible in particular that target patterns 8, 8a-8d are always aligned with high precision with respect to vehicle 4.

What is claimed is:

1. A calibrating device for calibrating a vehicle assistance system, comprising:
   at least one target pattern;
   at least one sensor to detect a position and orientation of a vehicle to be measured with respect to the calibrating device;
   a positioning device positioning the at least one target pattern based on the position of the vehicle to be measured, which is detected by the at least one sensor, so that the at least one target pattern is situated with respect to the vehicle to be measured in a specified orientation at a specified position; and
   at least one electronic display device to display the at least one target pattern optically;
   wherein based on data supplied by the at least one sensor, the positioning device determines a position, a size and an alignment of the at least one target pattern on the display device, and wherein the positioning device controls the display device so that that the display device displays the at least one target pattern in the determined alignment and size at the determined position,
   wherein the at least one target pattern includes a dynamic target pattern for the vehicle, the dynamic pattern being a tracking sequence,
   wherein calibrating panels have variable image display devices to represent static target patterns and dynamic target patterns for the vehicle, and
   wherein the positioning device is configured to vary the size, the orientation and the position of the target pattern on at least one electronic display device as a function of the position and the alignment of the vehicle on the measuring station, so as to display the at least one target pattern in a required size, alignment and orientation without the at least one target pattern or the display device being moved mechanically.

2. The calibrating device as recited in claim 1, further comprising:
   at least one moving device configured to move the target pattern and/or the calibrating device mechanically to position the target pattern in the specified orientation at the desired position.

3. The calibrating device as recited in claim 2, wherein the moving device includes at least one wheel and/or at least one roller to move the target pattern and/or the calibrating device mechanically, the at least one wheel and/or the at least one roller being guided in at least one rail.

4. The calibrating device as recited in claim 2, wherein the moving device is-configured to rotate the at least one target pattern about at least one axis.

5. The calibrating device as recited in claim 1, wherein the positioning device varies the display of the at least one target pattern on the at least one electronic display device to position the target pattern in the specified orientation at the specified position, the positioning device varying the size and/or the orientation and the position of the target pattern on the at least one electronic display device.

6. The calibrating device as recited in claim 1, wherein the at least one sensor includes at least one camera to detect optically the vehicle to be measured.

7. A method for calibrating a vehicle assistance system, the method comprising:
   (a) positioning a calibrating device in front of a vehicle to be measured, the calibrating device including at least one target pattern, at least one sensor configured to detect a position and orientation of a vehicle to be measured with respect to the calibrating device, and a positioning device to position the at least one target pattern based on the position of the vehicle to be measured, which is detected by the at least one sensor, so that the at least one target pattern is situated with respect to the vehicle to be measured in a specified orientation at a specified position;
   (b) determining the position and the orientation of the vehicle with respect to the calibrating device using the at least one sensor; and
   (c) positioning, via a positioning device, the at least one target pattern so that it is situated in the specified orientation at the specified position with respect to the vehicle;
   wherein the calibration device includes at least one electronic display device to display the at least one target pattern optically, and wherein based on data supplied by the at least one sensor, the positioning device determines a position, a size and an alignment of the at least one target pattern on the display device, and wherein the positioning device controls the display device so that that the display device displays the at least one target pattern in the determined alignment and size at the determined position, wherein the at least one target pattern includes a dynamic target pattern for the vehicle, the dynamic pattern being a tracking sequence, wherein calibrating panels have variable image display devices to represent static target patterns and dynamic target patterns for the vehicle, and wherein the positioning device is configured to vary the size, the orientation and the position of the target pattern on at least one electronic display device as a function of the position and the alignment of the vehicle on the measuring station, so as to display the at least one target pattern in a required size, alignment and orientation without the at least one target pattern or the display device being moved mechanically.

8. The method as recited in claim 7, further comprising:
attaching, prior to (b), a marking on the vehicle, the marking being marked on at least one location on a longitudinal driving axis of the vehicle.

9. The method as recited in claim 7, wherein a beam is mounted so as to be rotatable about an axis, which is oriented orthogonally with respect to a plane of a measuring station, wherein by swiveling about the axis, the beam is oriented so that it is at a right angle with respect to a longitudinal driving axis of the vehicle.

10. The method as recited in claim 9, wherein the positioning device is configured to swivel the beam and the at least one sensor, which detects the position and an alignment of the vehicle with respect to the calibrating device.

11. The method as recited in claim 7, wherein the positioning device takes into account and compensates for elevation variations, at least one calibrating panel for facing the vehicle, and which is attached to a beam that extends horizontally and orthogonally with respect to a longitudinal driving axis of the vehicle, and wherein at least one target pattern are put on the at least one calibrating panel.

12. The calibrating device as recited in claim 1, wherein a beam is mounted so as to be rotatable about an axis, which is oriented orthogonally with respect to a plane of a measuring station, wherein by swiveling about the axis, the beam is oriented so that it is at a right angle with respect to a longitudinal driving axis of the vehicle.

13. The calibrating device as recited in claim 11, wherein the positioning device is configured to swivel the beam and the at least one sensor, which detects the position and an alignment of the vehicle with respect to the calibrating device.

14. The calibrating device as recited in claim 1, wherein the positioning device takes into account and compensates for elevation variations, at least one calibrating panel for facing the vehicle, and which is attached to a beam that extends horizontally and orthogonally with respect to a longitudinal driving axis of the vehicle, and wherein at least one target pattern are put on the at least one calibrating panel.

* * * * *